No. 846,376. PATENTED MAR. 5, 1907.
A. H. ADAMS.
SPEED CHANGING AND BRAKE GEAR FOR MOTOR DRIVEN ROAD VEHICLES.
APPLICATION FILED JUNE 8, 1906.

3 SHEETS—SHEET 1.

Witnesses:

Inventor
Arthur H. Adams
By James L. Norris
Atty

No. 846,376. PATENTED MAR. 5, 1907.
A. H. ADAMS.
SPEED CHANGING AND BRAKE GEAR FOR MOTOR DRIVEN ROAD VEHICLES.
APPLICATION FILED JUNE 8, 1906.
3 SHEETS—SHEET 2.
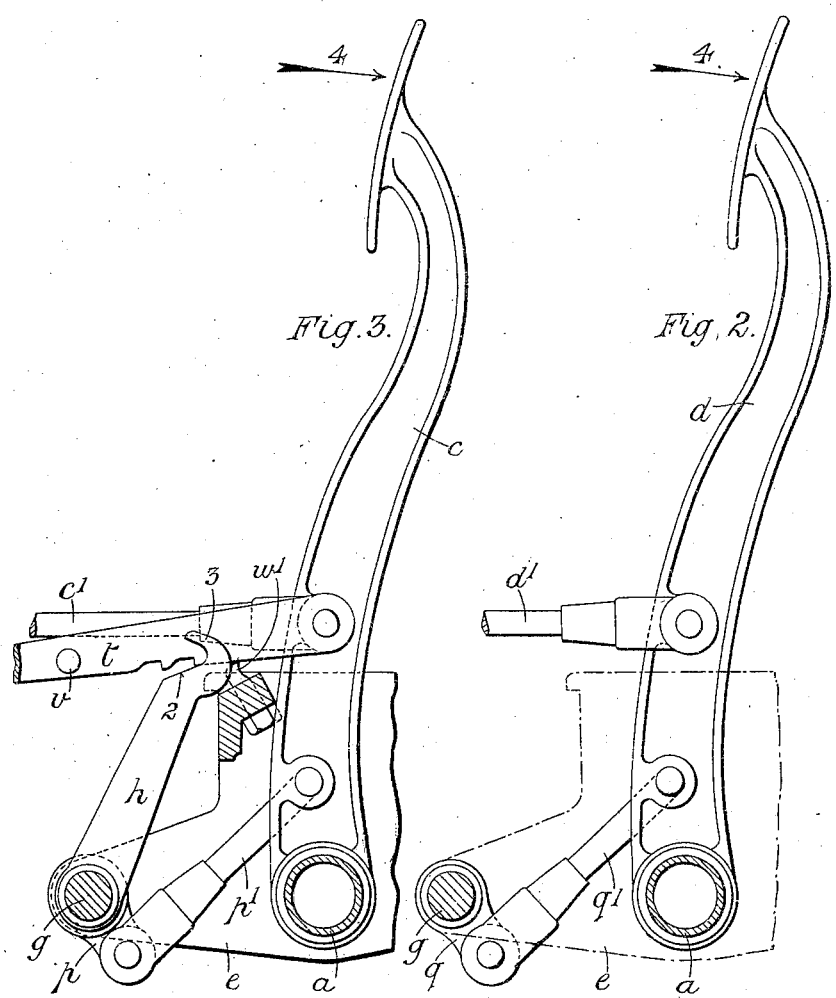

No. 846,376. PATENTED MAR. 5, 1907.
A. H. ADAMS.
SPEED CHANGING AND BRAKE GEAR FOR MOTOR DRIVEN ROAD VEHICLES.
APPLICATION FILED JUNE 8, 1906.

3 SHEETS—SHEET 3.

Witnesses

Inventor
Arthur H. Adams
By James L. Norris
Atty.

UNITED STATES PATENT OFFICE.

ARTHUR HENRY ADAMS, OF LONDON, ENGLAND.

SPEED-CHANGING AND BRAKE GEAR FOR MOTOR-DRIVEN ROAD-VEHICLES.

No. 846,376.     Specification of Letters Patent.     Patented March 5, 1907.

Application filed June 8, 1906. Serial No. 320,846.

*To all whom it may concern:*

Be it known that I, ARTHUR HENRY ADAMS, a citizen of the United States of America, residing at London, England, have invented certain new and useful Improvements Relating to Speed-Changing and Brake Gear for Motor-Driven Road-Vehicles, of which the following is a specification.

This invention relates to speed-changing and brake gear for motor-driven road-vehicles, and particularly to such gears as are controlled by pedals; and the said invention has for its object the provision of novel means whereby when one speed-changing gear is in the operative position and it is desired to throw into action another speed-changing gear the throwing into action of the second speed-changing gear will by a positive movement draw out of action the first speed-changing gear. It follows that only one speed-gear can be in the operative position at any time, and consequently no undue strains can be brought on the engine, such as may be brought on in those instances where two pedals can be "thrown in" at the same time. Similarly, the throwing into action of the brake and reversing pedal will "throw out" any forward-driving speed-changing gear that may be in action.

I will describe the invention as applied to a system of change-speed gearing controlled by three pedals, one of which is the high-speed pedal, one the low-speed pedal, and one the brake and reverse pedal.

Figure 1:
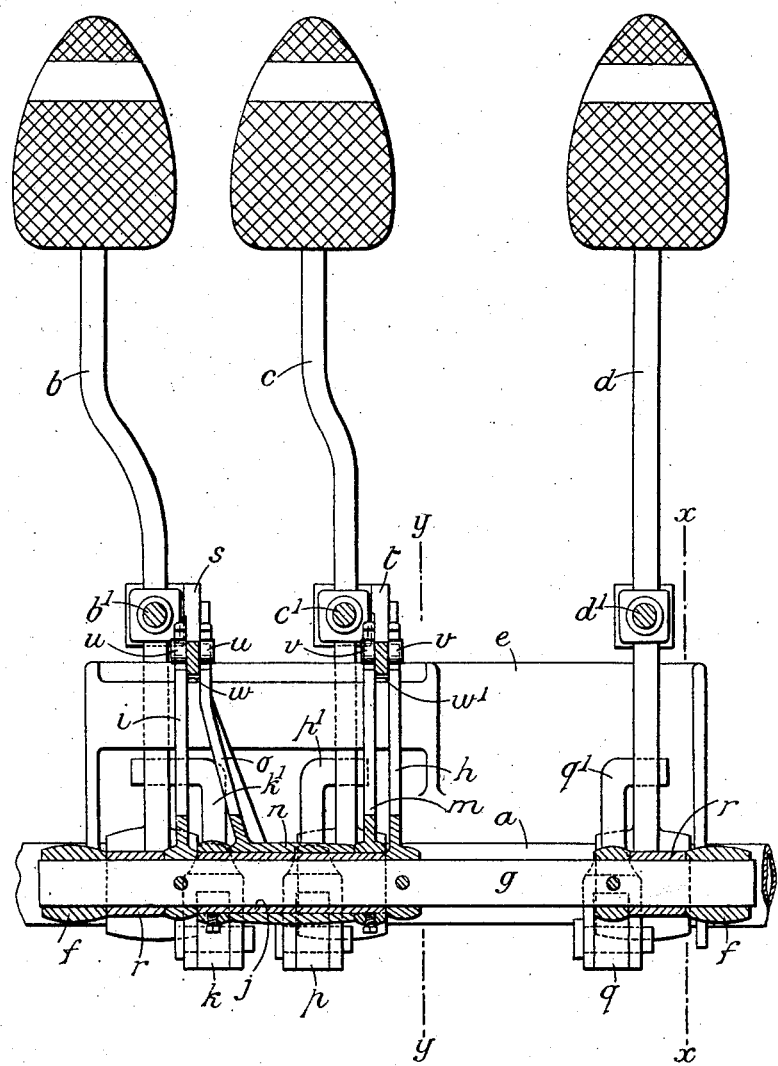
Figure 4:
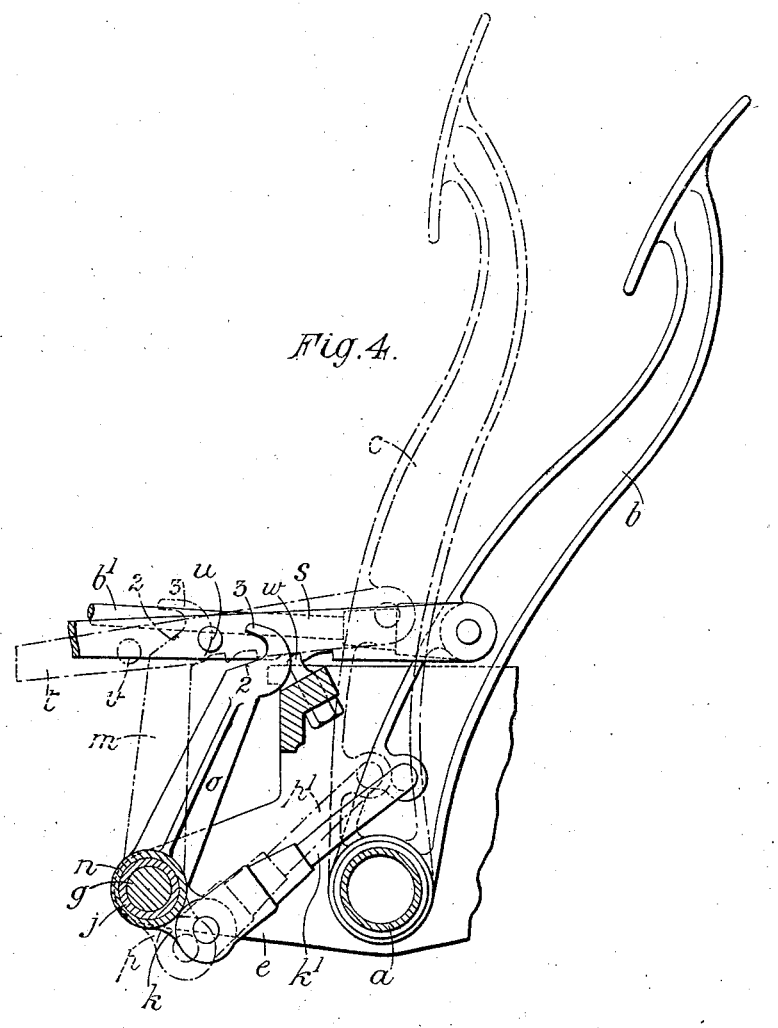

In the accompanying drawings, which show only such parts of the system as are necessary to illustrate the invention, Figure 1 is a face view of the pedals and of the mechanisms which form the subject of the present invention, parts being shown in section; and Figs. 2 and 3 are transverse sections taken on the lines $x\ x\ y\ y$, respectively, of Fig. 1 looking toward the left. Fig. 4 is a transverse section of Fig. 1, showing one of the pedals in operative position and another in dotted lines and in normal inoperative position. In Figs. 1, 2, and 3 the pedals are shown in the "off" position, and in Fig. 4 one of the pedals is shown in the "on" position.

Like letters of reference indicate corresponding parts in the several figures.

$a$ is a pedal-shaft. $b$ is a pedal-lever connected by a rod $b'$ to the high-speed gearing. $c$ is a pedal-lever connected by a rod $c'$ to the low-speed gearing, and $d$ is a pedal-lever connected by a rod $d'$ to the braking and reversing mechanism. Each of these pedal-levers is freely mounted on the shaft $a$, and these parts may be of any usual or convenient construction.

$e$ is a frame provided with bearings $f\ f$, in which a shaft $g$ is mounted. $h$ and $i$ are trip-levers fast on the shaft $g$. $j$ is a sleeve rotatably mounted on the shaft $g$ and having a lever $k$, Figs. 1 and 4, secured to one end thereof, and a trip-lever $m$, Fig. 1, secured to its other end. A second sleeve $n$, rotatably mounted on the first sleeve $j$, is provided with a trip-lever $o$, Figs. 1 and 4, and a lever $p$, Figs. 1 and 3, which are formed integrally therewith or fixed thereto. A lever $q$, Figs. 1 and 2, is also keyed on the said shaft $g$.

$r\ r$ are washers or distance-pieces.

The levers $k$, $p$, and $q$ are respectively coupled to the pedal-levers $b\ c\ d$ by links $k'$, $p'$, and $q'$. The pedal-levers $b$ and $c$ are provided with pivotally-attached toothed racks $s\ t$, furnished with trip-pins $u\ v$, respectively.

$w\ w'$ are fixed catches carried by the frame $e$.

The toothed racks $s\ t$ may be held in engagement with the fixed catches $w\ w'$, respectively, by their own weight or by a spring. (Not shown.)

The outer or free end of each trip-lever $h\ i$ $m\ o$ is provided with an inclined trip edge 2 (see Figs. 2 and 4) and a hook 3.

These parts operate as follows: The brake and reversing pedal $d$ not being furnished with a toothed rack and retaining-catch, the foot of the driver must be kept thereon to maintain this pedal in action, the pedal being thrown out of action (*i. e.*, brought to the position shown in the drawings) in the ordinary manner by a spring or otherwise as soon as the driver's foot is withdrawn. When this pedal is moved in the direction indicated by the arrow 4, Fig. 2, it acts through the link $q'$ and lever $q$ to rock the shaft $g$, which carries with it the trip-levers $h$ and $i$. Assuming that one or the other of the pedal-levers $b\ c$ has been previously moved so that the teeth or notches of its rack $s$ or $t$ are in engagement with the corresponding fixed catch $w$ or $w'$, thereby locking the said pedal-lever in its operative position, movement of the appropriate trip-lever $h$ or $i$, as above set forth, will cause the inclined trip edge 2 of said lever to slide under the coacting trip-pin $u$ or $v$, and thereby raise the said rack $s$ or $t$ so that the teeth or notches thereof are raised clear of the retaining-catch $w$ or $w'$. In the continued movement of the trip-lever $h$ or $i$ the hook 3 thereof engages the trip-pin $u$ or $v$ and through the latter positively draws back the pedal-lever to its inoperative position. The springs of the change-speed gearing will complete the withdrawal of the levers $b$ and $c$ when the latter have been unlocked and their movement started by the action of the trip-levers $h$ $i$. Light springs may be provided for pulling on the racks $s$ $t$ to assist the withdrawing action.

When the pedal-lever $b$ is in the thrown-in position, as shown in Fig. 4, a movement of the pedal-lever $c$ to bring this latter to the thrown-in position operates similarly through the link $p'$, lever $p$, sleeve $n$, trip-lever $o$, and trip-pin $u$ to throw out the pedal-lever $b$. This is possible, because in the off position of the lever $c$ its pin $v$ is some distance in front of the trip-lever $m$, as seen in Fig. 4, and before it reaches the hook of the trip-lever $m$ the movement of the pedal $c$ will have unlatched the pedal-lever $b$. Similarly, if the pedal-lever $c$ is standing in its thrown-in position a "throwing-in" movement of the pedal-lever $b$ acts through the link $k'$, lever $k$, sleeve $j$, trip-lever $m$, and trip-pin $v$ to release the pedal-lever $c$ and move it to the inoperative position in which it is shown in the drawings. Thus the pedal-levers $b$ and $c$ cannot both be in the operative position at the same time, and the drawing-out action on each lever is positive.

It is obvious that the speed-change control-levers and the brake-lever may be arranged to be worked by hand instead of by the foot.

What I claim is—

1. In mechanism for controlling the speed-changing gear of a motor-driven road-vehicle, the combination of speed-change control-levers, sleeves, means for positively connecting each of said sleeves to a corresponding speed-change control-lever, and trip mechanism operating between each of said sleeves and the speed-change control-levers to which the individual sleeve in not positively connected.

2. In mechanism for controlling the speed-changing gear of a motor-driven road-vehicle, the combination of speed-change control-levers, sleeves, link-and-lever mechananism connecting each of said sleeves to a corresponding speed-change control-lever, and trip mechanism operating between said sleeves and the speed-change control-levers to which the individual sleeve is not positively connected.

3. In mechanism for controlling the speed-changing gear of a motor-driven road-vehicle, the combination of speed-change control-levers, toothed racks extending one from each of said speed-change control-levers, fixed catches respectively adapted to be engaged by one of said toothed racks, sleeves, means for positively connecting each of said sleeves to a corresponding speed-change control-lever and trip mechanism operating between each of said sleeves and the speed-change control-levers to which the individual sleeve is not positively connected.

4. In mechanism for controlling the speed-changing gear of a motor-driven road-vehicle, the combination of speed-change control-levers, means for locking said speed-change control-levers individually in their operative positions, sleeves, means for positively connecting each of said sleeves to a corresponding speed-change control-lever, a trip-pin corresponding to each speed-change control-lever and attached thereto, and trip-levers extending from each of said sleeves and coacting with the trip-pins, attached to each speed-change control-lever to which the individual sleeve is not positively connected.

5. In mechanism for controlling the speed-changing gear of a motor-driven road-vehicle, the combination of speed-change control-levers, means for locking said speed-change control-levers individually in their operative positions, sleeves, means for positively connecting each of said sleeves to a corresponding speed-change control-lever, a trip-pin corresponding to each speed-change control-lever and attached thereto, and trip-levers extending from said sleeves, there being an inclined trip edge on said levers respectively coacting with said trip-pins.

6. In mechanism for controlling the speed-changing gear of a motor-driven road-vehicle, the combination of speed-change control-levers, toothed racks extending one from each of said speed-change control-levers, fixed catches respectively adapted to be engaged by one of said toothed racks, trip-pins corresponding to each toothed rack and extending therefrom sleeves, means for positively connecting each of said sleeves to a corresponding speed-change control-lever, trip-levers extending from said sleeves to positions adjacent to the trip-pins respectively attached to each speed-change control-lever to which the individual sleeve is not positively connected, there being inclined trip edges on said trip-levers, and hooks on said trip-levers respectively adapted to engage the corresponding trip-pin.

7. In mechanism for controlling the speed-changing gear of a motor-driven road-vehicle the combination of speed-change control-levers, an auxiliary shaft, sleeves, means for positively connecting each of said sleeves to a corresponding speed-change control-lever, and trip mechanism operating between each of said sleeves and the speed-change control-levers to which the individual sleeve is not positively connected.

8. In mechanism for controlling the speed-changing gear of a motor-driven road-vehicle, speed-change control-levers movable from normal inoperative to operative position independently of each other, a brake-lever, an auxiliary shaft, means fixed to said shaft and having connection with said brake-lever for rocking said shaft by movement of the brake mechanism, means connected to said shaft and operative upon the speed-control levers for returning the latter to normal position by movement of the shaft, and independent means associated with each of said control-levers so that when one of the levers is operated the remaining levers will be returned to an inoperative position.

9. In mechanism for controlling the speed-changing gear of a motor-driven road-vehicle, the combination of change-speed control-levers, a brake-lever, an auxiliary shaft, means for positively rocking said shaft by the movement of said brake-lever, trip-pins corresponding to each of said change-speed control-levers and attached thereto, and trip-levers fast on said auxiliary shaft and hooks there being inclined trip edges on said trip-levers respectively adapted to engage the respectively corresponding trip-pins.

10. In mechanism for controlling the speed-changing gear of a motor-driven road-vehicle, the combination of change-speed control-levers, a toothed rack corresponding to each of said change-speed control-levers and extending therefrom, fixed catches respectively adapted to be engaged by said toothed racks, trip-pins on said toothed racks, a brake-lever, an auxiliary shaft, means connecting the said shaft with the brake-lever for positively rocking said shaft by the movement of said brake-lever and trip-levers fast on said auxiliary shaft having an inclined trip edge and a hook adapted to engage the respectively corresponding trip-pins.

11. In mechanism for controlling the speed-changing gear of a motor-driven road-vehicle, the combination of speed-change control-levers, a brake-lever, an auxiliary shaft, means for positively rocking said shaft by the movement of said brake-lever, sleeves mounted on said auxiliary shaft, means for positively connecting each of said sleeves to a corresponding speed-change control-lever, trip mechanism operating between each of said sleeves and the speed-change control-levers to which the individual sleeve is not positively connected, and trip mechanism operating between said auxiliary shaft and all the said speed-change control-levers.

In testimony whereof I have hereunto set my hand in presence of two subscribing witnesses.

ARTHUR HENRY ADAMS.

Witnesses:
 FREDK. L. RAND,
 H. D. JAMESON.